3,404,490
HONING MACHINE WITH AUTOMATIC
FORCE CONTROL
Mark R. Estabrook, Rockford, Ill., assignor to Barnes Drill Co., Rockford, Ill., a corporation of Illinois
Filed Sept. 17, 1965, Ser. No. 488,009
14 Claims. (Cl. 51—165)

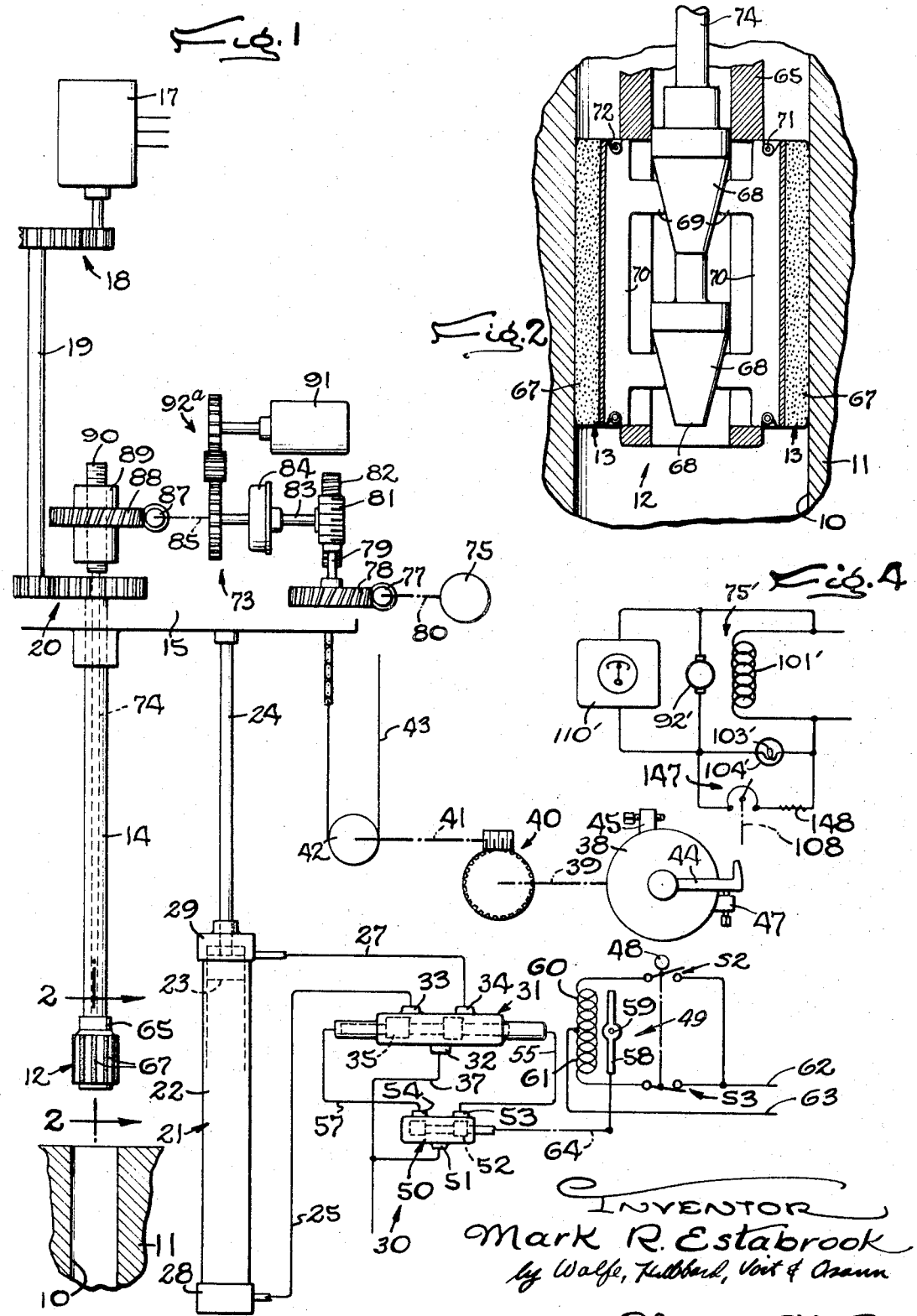

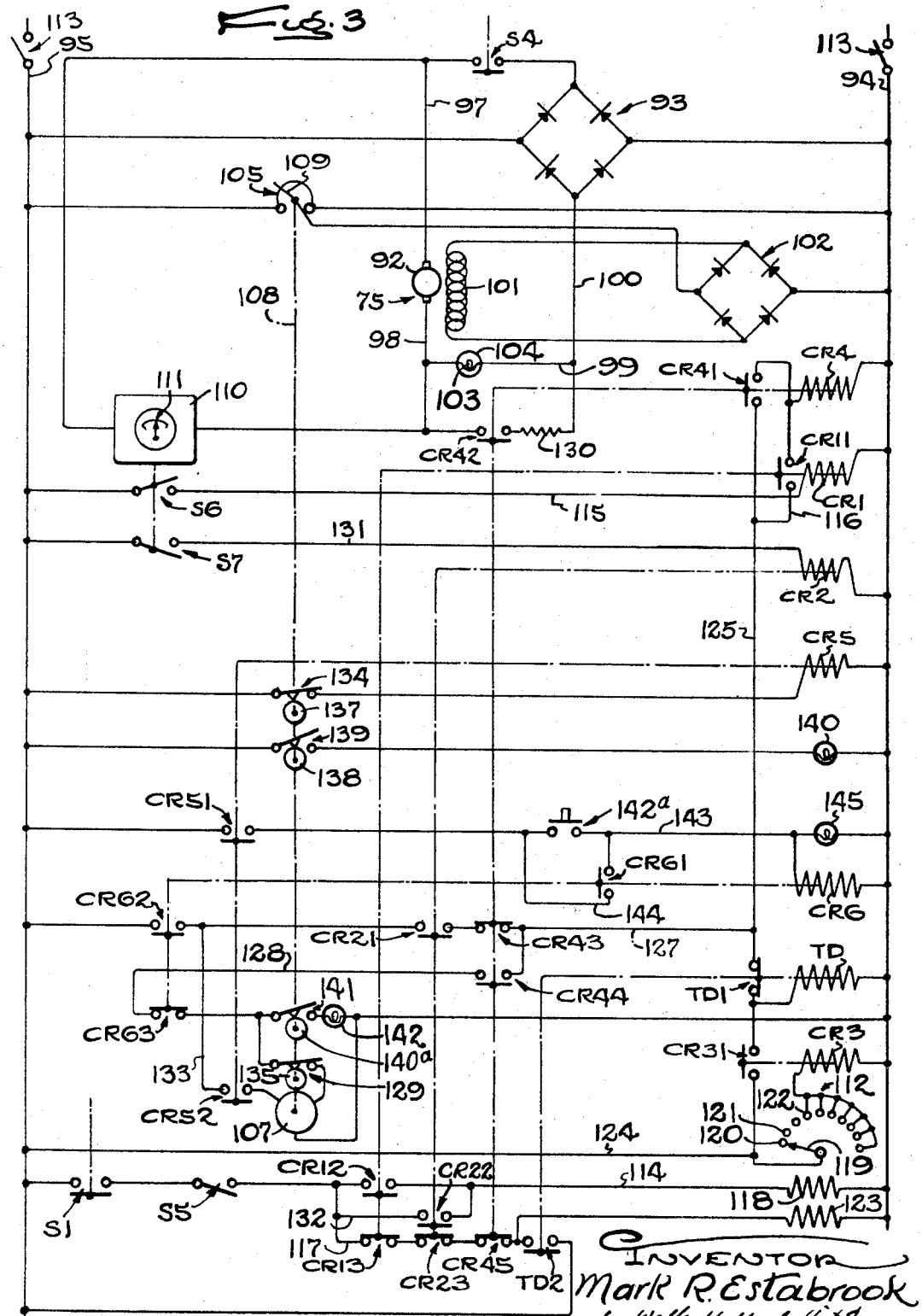

ABSTRACT OF THE DISCLOSURE

A conventional honing machine with mechanism for expanding the honing tool and varying the expanding force in response to and in relation to the changing resistance offered by the work. An electric motor driving the expansion mechanism has a tungsten filament lamp in series with its armature, and a variable transformer controls the energization of its field and is adjusted to increase and decrease the field voltage by a reversible motor actuated by a meter relay unit to maintain the armature voltage within preselected limits. An alternate form has a rheostat in parallel with the lamp that is adjusted automatically in a similar manner to increase and decrease the torque of the motor.

---

This invention relates to the control of automatic abrading machines for enlarging and finishing work bores by reciprocating and rotating an expansible honing tool within the bore while gradually expanding the tool to maintain working pressure between the abrading elements thereon and the bore wall. More particularly, the invention relates to the control of an electric motor driving the mechanism for applying an expanding force to the tool.

The general object of the present invention is to vary the expanding force automatically in response to and in direct relation to the changing resistance to expansion offered by the bore wall in order to obtain optimum honing pressure throughout the honing cycle, and to adjust the maximum honing force level to be obtained with a given workpiece automatically in accordance with the honing performance as the cycle progresses.

A more detailed object is to modulate the increasing torque of the motor automatically in response to variations in the current drawn by the motor and, in addition, to increase or decrease the torque capacity of the motor automatically throughout the cycle as required to maintain optimum honing pressure for the particular workpiece.

Another object is to use the armature voltage of the motor as an indication of motor performance and adjust the motor torque in response to measured changes in such voltage.

The invention also resides in the novel mechanism for automatically adjusting the motor torque throughout the honing cycle.

Other objects and advantages of the invention will become apparent from the following detailed description taken in connection with the accompanying drawings, in which FIGURE 1 is a schematic view of the basic components of an automatic honing machine embodying the novel features of the present invention, together with a diagram of part of the reciprocation control of the machine.

FIG. 2 is an enlarged fragmentary cross-sectional view taken along the line 2—2 of FIG. 1 and showing the honing tool inside the work bore.

FIG. 3 is an electrical diagram of the primary elements of the expansion control.

FIG. 4 is a fragmentary diagram showing an alternate form of part of the control shown in FIG. 3.

As shown in the drawings for purposes of illustration, the invention is embodied in an automatic honing machine for removing surface roughness from the wall 10 (FIGS. 1 and 2) of a bore in a workpiece 11 while enlarging the bore to a preselected size by reciprocating an expansible abrading tool 12 back and forth through the bore and simultaneously rotating the tool with abrasive elements 13 (FIG. 2) thereon pressed against the wall. As the wall is worn away and the bore is enlarged, the tool is expanded to maintain working pressure until the bore attains the desired size.

In this instance, the machine is of the vertical type in which the tool 12 is carried on the lower end of an elongated hollow spindle 14 journaled on its upper end on a head 15 slidable up and down along vertical guides (not shown) and rotated relative to the head by an electric motor 17 connected by gearing 18 to a drive shaft 19 geared at 20 to the upper end of the spindle. Reciprocation of the head through forward and return strokes is produced by a reciprocating hydraulic actuator 21 comprising a stationarily mounted cylinder 22 with a piston 23 guided therein for up and down movement and connected to the head by a rod 24 projecting through the upper end wall of the cylinder. Hydraulic lines 25 and 27 communicate respectively with the head end 28 and the rod end 29 of the cylinder to deliver pressure fluid from a suitable source to the cylinder through a reciprocation control indicated generally at 30 and herein including a pilot-operated valve 31 which alternates the flow of pressure fluid to the opposite ends of the cylinder and thus controls the reciprocation of the head and the tool.

The control valve 31 is a standard four-way valve having an inlet port 32 intermediate its ends, spaced outlet ports 33 and 34 adjacent its opposite ends communicating respectively with the lines 25 and 27, and a spool 35 slidably guided for back and forth movement between a "forward" or "down" position (not shown) shifted to the right, and a "reverse" or "up" position (FIG. 1) shifted to the left. In the "down" position of the spool, the valve delivers pressure fluid from a supply line 37 through the line 27 to the rod end 29 of the cylinder 22, and in the "up" position, it delivers pressure fluid to the line 25 and the head end 28 of the cylinder. Exhaust flow from the cylinder returns through the idle line and the usual exhaust ports in the control valve to an exhaust line (not shown).

Herein, the control valve 31 is operated in response to reversal signals produced in a well-known manner by a control disk 38 (FIG. 1) fast on a shaft 39 geared at 40 to a second shaft 41 carrying a sprocket 42 around which a flexible chain 43 is trained, the chain being fastened at both ends to the head 15 and also trained around a second sprocket (not shown) above the head. Accordingly, the disk oscillates about the axis of its shaft in unison with the up and down motion of the head. Pivoted on the shaft alongside the disk is an arm 44 which is disposed between two lugs 45 and 47 on the periphery of the disk and is rocked back and forth about the shaft axis by the lugs. As the disk turns clockwise during the down stroke of the head, the lug 45 picks up the arm 44 and carries it clockwise with the disk until the free end of the arm engages the operator 48 of a pair of companion switches S2 and S3, closing the switch S2 and opening the other. As the disk turns counterclockwise during the up stroke, the lug 47 picks up the arm, rocking it counterclockwise and away from the switch operator to permit the switch S2 to open while the switch S3 closes. The two lugs are positioned to close the switch S2 each time the head 15 approaches the end of its down stroke and to close the switch S3 as the head approaches the end of the up stroke thereby signaling the need for reversal of the direction of movement of the tool 12.

These switches actuate a reversible torque motor 49

(FIG. 1) operating a reversing valve 50 for delivering pilot-pressure fluid to the opposite ends of the control valve 31 to shift the spool 35 therein back and forth at the appropriate times. In this instance, the reversing valve is formed with an inlet port 51 between the two heads of the valve spool 52 communicating with the supply line 37, and two outlet ports 53 and 54 adjacent the ends of the valve opening into pilot lines 55 and 57 leading to the control valve. The spool 52 is guided in the valve for back and forth movement through a neutral centered position (FIG. 1) in which the inlet port is closed, and moves in both directions from this position to open one of two feed orifices communicating between the inlet and one or the other of the outlets and the associated pilot lines. When the spool is displaced to the left from the centered position, pilot fluid flows to the outlet 54 and the pilot line 57. In the opposite direction of displacement, fluid from the inlet flows to the outlet 53 and the pilot line 55. The pilot lines open into two pressure chambers formed in the control valve body at the opposite ends of the control valve spool. Flow through the line 57 shifts the spool to the right, while flow through the line 55 shifts the spool to the left.

As shown schematically in FIG. 1, the torque motor 49 has an armature 58 pivotally supported intermediate its ends on a shaft 59 with energizing coils 60 and 61 associated with the opposite ends of the armature. The ends of the armature are disposed between two sets of opposed poles on two magnetic pole pieces (not shown). When the motor is deenergized, the armature is mechanically centered between the pole pieces, for example, by using a torsionally flexible shaft 59 which urges the armature to the centered position shown in FIG. 1 but is capable of twisting in both directions to permit rotation of the armature in response to the force applied when either of the armature coils is energized. These coils are connected in parallel across two D.C. power lines 62 and 63 of the control circuit (see FIG. 1) and are alternately energized through the control switches S2 and S3 near the ends of the respective strokes of the head 15. The reversing control illustrated herein is a conventional unit sold by Minneapolis Honeywell as Part No. V7038A1051.

One end of the torque motor armature 58 is connected by a rod 64 to the spool 52 of the reversing valve 50 so that the rocking motion of the armature is transmitted to the spool as linear movement thereof. When the switch S3 closes to energize the coil 61, the armature turns clockwise to shift the spool to the left from the center position. When the switch S2 closes, the coil 60 is energized to turn the armature counterclockwise to shift the spool to the right. Thus, the operation of the switches by the control disk 38 controls the operation of the valves 31 and 50 and the resulting reciprocation of the head 15 and the tool 12.

Herein, the abrading tool 12 is of a conventional type comprising a hollow, generally cylindrical body (see FIGS. 1 and 2) having a coaxial shank 65 at one end fastened to the lower end of the spindle 14, the body being formed with a plurality of angularly spaced longitudinal slots in which honing elements 13 are carried. Each honing element includes a stick or stone 67 of bonded abrasive material disposed with a snug fit in one of the slots with the outer face of the stone constituting a working surface engageable with the bore wall 10. During honing, the honing elements are fed outwardly by an expansion mechanism including an expander disposed within the hollow tool body and comprising two coaxial conical cams 68 (FIG. 2) engaging followers 69 projecting inwardly from backing bars 70 carrying the honing stones, the followers being held against the cams by garter springs 71 fitted in notches 72 at the ends of the backing bars. With this arrangement, downward movement of the expander feeds the honing elements outwardly to expand the tool, and upward movement of the expander permits contraction of the tool by the springs.

Controlled movement of the expander cams 68 during the honing cycle is produced by a drive mechanism 73 (FIG. 1) mounted in the head 15 and connected to the expander by a so-called push rod 74 fastened at its lower end to the expander and extending upwardly through the hollow spindle 14 into the head. While the drive mechanism may take different well-known forms, herein it is driven by an electric motor 75 (FIGS. 1 and 3) and comprises a worm 77 meshing with a worm wheel 78 on a shaft 79 perpendicular to the motor shaft 80 and carrying a second worm 81 meshing with a worm wheel 82 on a shaft 83 coupled by a selectively engageable clutch 84 to an output shaft 85. The latter drives a worm 87 meshing with a worm wheel 88 formed on a sleeve 89 internally threaded onto a screw 90 on the upper end of the push rod 74 thereby forming a screw device for converting the rotary motion of the feed motor and its reduction gearing into relatively slow endwise motion of the push rod and slow outward feeding of the stones 67.

A second motor 91 (FIG. 1) is geared at 92a directly to the output shaft 85 to shift the honing stones 67 at rapid traverse rates toward and away from the bore wall 10. The clutch 84 is engaged during operation of the feed motor 75 and disengaged during operation of the traverse motor 91 which simply turns idly during slow feeding of the honing elements. This arrangement and the automatic controls for its operation are well known to those skilled in the art.

In the illustrative machine, the feed motor 75 is a shunt-wound D.C. motor with its armature 92 (FIG. 3) receiving D.C. current from a rectifier 93 connected across two A.C. power lines 94 and 95. One terminal of the motor armature is connected to the positive output side of the rectifier by a line 97 and the other armature terminal is connected through a line 98 to lines 99 and 100 connected to the negative side of the rectifier. The motor field winding 101 is supplied with D.C. current by a second rectifier 102 connected across the A.C. lines. The motor may be a 1/20 H.P. motor operating on a selected D.C. input voltage on the order of 100 volts.

In the honing operation, efficient action of the stones 67 is dependent upon the pressure with which they are pressed against the bore wall 10 by the expansion mechanism 73 and the feed motor 75. Optimum performance depends upon the proper correlation of feed motor torque and feed rate with the resistance to expansion of the tool 12 offered by the bore wall. This resistance, of course, depends upon the rate of wearing away of the wall and resulting rate of enlargement of the bore. At the beginning of a typical honing operation, the bore wall is comparatively rough and irregular and the hone operates primarily on ridges and high spots on the wall. These can be worn away at a relatively rapid rate, so resistance to expansion is low and the stones can be fed outwardly at a relatively rapid rate without excessive pressure and damaging stresses. As honing progresses, however, the stones encounter a progressively increasing surface area and eventually reach base metal, the metal of a substantially smooth and cylindrical wall. During the remainder of the honing operation, which is devoted to the enlargement of the bore to the preselected size, the resistance to expansion of the tool is the highest and remains substantially constant.

It is fundamental that the torque exerted by the feed motor 75 increases as the armature current increases, according to the well-know squation $T = K \phi I_a$, where T is the motor torque, K is a constant, $\phi$ is the flux per pole of the motor, and $I_a$ is the armature current. Moreover, the armature current is determined by the equation $$I_a = (E_a - E_b)/R_a$$

where $E_a$ is the terminal voltage applied to the armature, $R_a$ is the armature resistance, and $E_b$ is the back voltage generated by the armature. The back voltage, in turn, varies directly with the speed of the motor when $\phi$ is constant. Thus, as the increasing resistance to expansion of the tool reduces the motor speed and the back voltage, both the armature current and the motor torque increase, and the motor exerts a correspondingly increasing honing force on the stones through the expansion mechanism.

The present invention contemplates a novel honing control for automatically modulating the increase in motor torque to obtain a progressively increasing honing force level befitting the changing condition of the bore wall 10 and a final honing force producing optimum honing pressure for the type of workpiece 11, the nature of the stones 67, and other variables in the honing operation thereby to obtain optimum honing speed and pressure commensurate with good stone life and quality performance. To these ends, a resistor 103 (FIG. 3) having a positive temperature coefficient of resistance and a temperature that varies over a wide range with the rate of current flow through the resistor is connected in series with the motor armature 92 to modulate the progressive increase in current flow through the armature and the resulting torque increase. Moreover, the torque of the motor 75 and the eventual maximum torque to be exerted under the control of the resistor are adjusted automatically throughout the cycle, independently of the resistor, in response to the actual resistance offered by the bore wall and the performance of the motor in order to select the honing rate best suited for the particular workpiece.

It is well known that tungsten filaments in the protective atmosphere of standard incandescent lamp bulbs display the above temperature-resistance characteristics. With such a lamp bulb 104 in series with the motor armature 92 as shown in FIG. 3, the resistance of the filament 103 increases as the current drawn by the armature increases, thereby raising the voltage drop across the lamp at a rapid rate. It is believed that the resistance increases generally in proportion to the current and the voltage drop increases in proportion to the square of the current. This increases in the voltage drop modulates the torque increase by reducing the available terminal voltage $E_a$ as the back voltage $E_b$ drops, thereby controlling the rate of current increase.

With no additional control, the varying resistance of the filament 103 determines the magnitude of the honing force exerted throughout the cycle. The force will increase generally along a substantially straight line as the voltage is reduced, until the maximum force level is attained during the final portion of the cycle when voltage stabilizes and the force line levels off. The rating of the particular bulb used affects the magnitude of the final force.

To vary the honing force throughout the cycle and the maximum force at the end of the cycle produced under the control of the lamp 104, the motor torque with a prevailing lamp filament resistance is increased and decreased as the situation requires. This is accomplished by a torque selector 105 actuated in response to variations in the armature voltage $E_a$ and operable to increase the motor torque independently of the filament 103 when the voltage drops to a preselected low value indicating the motor 75 is at or near the stalled condition, and to reduce the torque independently of the filament when the voltage increases to a preselected high value. In this manner, the selector cooperates with the filament in controlling the honing force level for optimum performance by maintaining the armature voltage within a preselected approximate range.

In the preferred form shown in FIG. 3, the torque selector 105 is a variable transformer controlling the degree of energization of the field winding 101 of the feed motor 75. When the field voltage is increased, the flux value $\phi$ in the equation $T = K\phi I_a$ is increased to strengthen the field and increase the torque of the motor. Conversely, a reduction in the voltage weakens the field to reduce the flux and the motor torque. The selector is operated by mechanism including a reversible motor 107 (FIG. 3) driving an output shaft 108 connected to the slide 109 of the selector, and the selecting motor is actuated by a device 110 measuring the voltage across the armature 92 and operating control switches S6 and S7 when the armature voltage attains the preselected limits. The control switches, in turn, are in control circuits for operating the motor 107 in selected directions.

Herein, the device 110 is a so-called meter relay unit which may be of the type sold by Assembly Products Inc., Chesterland, Ohio, as Model 503-L Double Set-Point Meter Relay and Control Module Catalog No. 903. In such units, the prevailing voltage is indicated on a scale 111. A drop in the voltage to a selected low value, at or near the value at which the feed motor stalls, energizes the relay (not shown) to close the switch S6, while increases in the voltage to a selected high value oppositely energizes the relay to close the switch S7. It will be evident to those skilled in the art that the voltage across the lamp 104 varies reversely but in the same manner as the voltage across the armature and thus may be used as an indication of motor performance.

To avoid temporary corrections due to transient changes in the bore condition, the selecting motor 107 is operated in response to the actuation of the control switches S6, S7 only after a time delay sufficient to insure that the condition actually requires a torque correction. For this purpose, a counter 112 is interposed in the control circuits to activate the selecting motor only if the condition remains after a preselected number of strokes of the tool 12. The extent of the corrections, which may be of any suitable magnitude, herein is controlled by a timer TD which deenergizes the selecting motor after a timed interval of operation producing the desired increment of selector adjustments, as will be evident from the following summary of operation and description of the control circuits.

*Control circuits and summary of operation*

The automatic honing cycle is initiated in the usual manner with controls that are well known to those skilled in the art and thus are not shown in detail herein. For present purposes, it is sufficient to state that start switches 113 (FIG. 3) are closed in the A.C. power lines 94 and 95 to activate the control circuits (which are shown in deenergized condition) and another start switch S1 is closed to prepare a circuit for the torque selector control through a line 114 across the A.C. lines. When the head 15 is raised as shown in FIG. 1, the switches S2 and S3 operated by the control disk 38 are in the condition shown in FIG. 1 so that the torque motor coil 61 is energized to turn the armature 58 clockwise and admit pilot fluid through line 57 to the chamber in the left end of the control valve 31, shifting the spool thereof to the right to admit pressure fluid from the supply line 37 through line 27 to the rod end 29 of the cylinder 22. This starts the head down to feed the tool 12 downwardly through the bore and turns the control disk clockwise so that the lug 45 picks up the arm 44 and turns it clockwise.

As the tool 12 approaches the lower end of its stroke, the arm 44 engages the operator 48 to close switch S2 while opening switch S3, thereby energizing the coil 60 to rotate the armature counterclockwise and reverse the conditions of the valve 50 and the control valve 31. The latter then admits pressure fluid from the supply line 37 through line 25 into the head end 28 of the cylinder 22 to start the head back up. The reciprocation of the head continues throughout the cycle under the control of the disk 38 and the switches S2 and S3.

At the end of the first downstroke, a switch S4 (FIG. 3) closes automatically to complete the D.C. circuit from the rectifier 93 through the feed motor armature 92 to start the slow feeding of the stones 67, the rapid initial expansion of the tool 12 having been completed by the traverse motor 91 in the usual manner. Thus, the feed motor 75 begins to operate with the stones close to or pressed lightly against the rough bore wall 10 which offers at most a negligible resistance to tool expansion. Accordingly, the feed motor begins to operate at or near its relatively rapid no-load speed to feed the stones outwardly against the bore wall. Due to the high back voltage $E_b$ generated by the motor at this time, the initial armature control $I_a$ is low, the resulting torque is low, and the lamp filament temperature and resistance have correspondingly low values. Of course, there is a brief period in which the various values adjust to each other and attempt to attain an equilibrium condition.

The transformer 105 for the feed motor field winding 101 initially is set for a low field strength and a motor torque commensurate with the low initial resistance to expansion offered by the inner edges of the ridges and high spots on the wall 10, this low torque being sufficient to feed the stones and expand the tool at relatively rapid rates. If the transformer is set for minimum field strength, the motor runs at maximum speed to avoid wasted cycle time during the initial feeding. As the resistance begins to build up and drop the armature speed, however, the back voltage increases and the armature current begins to increase. This automatically and correspondingly increases the filament temperature and resistance to increase the voltage drop across the lamp 104 and thereby modulate the armature current increase and the resulting rise in torque.

Eventually, the resistance to expansion rises to a value high enough, as compared to the maximum feed motor torque capacity with the initial field setting, to stall or nearly stall the motor 75. Accompanying this build-up in resistance is a progressive drop in the armature voltage as measured by the meter device 110. When the voltage drops to the preselected minimum, for example, 5–10 volts, it closes the switch S6 and completes a circuit through a line 115 to a relay CR1 which, when energized, closes its switch CR12 in line 114 and opens switch CR13 in a parallel line 117. Switch CR11 closes idly in a line 116. At the beginning the next up stroke after the switch S6 closes, a switch S5 (FIG. 3) closes in the line 114, and a pulse is delivered to the counter 112 which herein is a conventional stepping switch actuated by pulses through its coil 118. Thus, the switch arm 119 is advanced one step from its first contact 120 to the second contact 121.

In this instance, the switch S6 must remain closed for three successive up strokes before the arm 119 reaches an active contact 122 and initiates corrective action. If switch S6 opens during these three strokes, indicating that the condition has been corrected without a torque adjustment, relay CR1 is deenergized immediately and recloses its switch CR13 in line 117. Subsequent closure of switch S5 then completes a circuit through the reset coil 123 of the stepping switch to return the switch arm to the first contact 120.

When the switch arm 119 reaches the active contact 122, a circuit is completed through a line 124, the switch, and a relay CR3 which closes its switch CR31 in a line 125 to energize a timer TD and another relay CR4 through the circuit prepared by switch CR11. Relay CR4 immediately operates its switches to complete a holding circuit through switch CR41 around switch CR11, and to energize the selecting motor forwardly through a circuit including switch CR31, the normally closed timer switch TD1, two lines 127 and 128, now closed switch CR44, and normally closed switches CR63 and 129 to start the selector motor 107 in a direction to increase the field voltage and strength. This increases $\phi$ in the equation $T=K\phi I_a$ to increase the motor torque. After a selected interval such as two seconds of motor operation, the timer TD times out to open its switch TD1 and deenergize the motor. At the same time, switch TD2 closes to energize the reset coil 123, resetting the stepping switch and thereby deenergizing relays CR3 and CR4.

The increased torque of the feed motor 75 should start the motor turning if it was stalled, although in some instances the torque increase alone may not be sufficient to start the motor. To insure starting under all circumstances, a switch CR42 is closed by the relay CR4 at the beginning of the correction to bring in a conventional resistor 130 connected in parallel with the lamp bulb 104 and making an increased voltage available across the armature during the torque correction. This resistance is removed from the circuit when relay CR4 is deenergized after the correction has been completed. As the honing cycle progresses, successive upward adjustments in torque are to be expected as a result of the low initial torque capacity of the feed motor 75 and the progressive increase in resistance. Whenever the armature voltage drops to the selected minimum, switch S6 closes and initiates the above-described correction cycle.

As a result of a change in the condition of the stones 67 or the bore wall 10, or as a result of an over-correction in torque, the torque of the feed motor 75 may exceed the prevailing resistance by an amount sufficient to accelerate the motor significantly. The accompanying rise in the armature voltage operates the meter relay 110 to close the switch S7 when the voltage attains the selected maximum value, for example, a voltage on the order of 20–25 volts. Closure of switch S7 completes a circuit through a line 131 and a relay CR2 to initiate a reduction in the field strength. For this purpose, relay CR2 closes its switch CR22 in a line 132 around switch CH12 while opening switch CH23 in the reset line 117. Again, the stepping coil 18 is energized each time switch S5 closes to begin the up stroke of the head 15. If the switch S7 remains closed during three successive strokes, the switch arm 119 completes a circuit through relay CR3 and the timer TD. Relay CR4 remains deenergized because switches CR11 and CR41 are open in its circuit, so switch CR44 remains open in the forward circuit of the selector motor 107. Instead, a reverse circuit is completed through line 127, now closed switches CR43 and CR21 in lines 127, and switch CR52 in a line 133 connected to the motor, relay CR5 being energized through a normally closed switch 134. Thus, the motor 107 runs in reverse to reduce the field strength. The increment of reduction is determined either by the timing out of timer TD as before, or by the opening of the meter switch S7 as a result of the reduction in motor strength and the accompanying reduction in armature voltage below the high limit, whichever occurs first.

It will be evident that each setting of the transformer 105 produces a new set of motor characteristics dictated, in effect, by the resistance "seen" by the stones 67 and indicated by the lamp 104. These corrections continue automatically as the bore condition changes. When all the roughness and high spots have been removed from the wall 10, the subsequent changes in resistance are slight and seldom require a change in the motor torque. During the final portion of the cycle, therefore, when the stones are operating on base metal and enlarging the bore to the selected size, the torque should remain fairly constant at the high level selected automatically by the control.

As a precautionary measure, two cams 135 and 137 are mounted on the shaft 108 connecting the motor 107 to the slide 109 of the transformer 105 to operate the switches 129 and 134 at the desired limits of turning of the shaft. The switch 134 normally is closed in the circuit of relay CR5 whose switch CR52 normally is closed in the reverse circuit of the selecting motor. If the control ever attempts to rotate the shaft in reverse beyond the desired minimum setting of the transformer, switch 134 is opened to deenergize relay CR5 and open switch CR52. A companion cam 138 on the shaft simultaneously closes a switch 139 to light a lamp 140 signaling the condition of the circuit. The cam 135 is shaped and positioned on the shaft 108 to open the switch 129 in the forward circuit of the selecting motor 107 if the control attempts to exceed the maximum voltage setting of the transformer 105. Another cam 140a simultaneously closes a switch 141 to light a signal lamp 142 indicating the occurrence of this condition. Thus, the two cams 135 and 137 and their switches 129 and 134 limit the arc through which the transformer slide 109 can be turned by the control.

To reset the transformer 105 for minimum field strength and torque at the beginning of each successive honing cycle, the machine operator closes a manual reset switch 142a to complete a circuit through closed switch CR51 and line 143 to a relay CR6 which closes its switch CR61 in a holding circuit 144 around the reset switch, and also closes switch CR62 to complete a circuit through line 133 and closed switch CR52 to operate the selecting motor 107 in reverse. A signal lamp 145 is lighted during this resetting operation. When the cam 137 opens its switch 134 at the lower limit of transformer adjustment, relay CR5 is deenergized to open switches CR51 and CR52 and terminate the resetting. The first upward adjustment of the transformer during the next honing cycle turns the cam 137 to close the switch 134.

With the representative 1/20 H.P. feed motor 75 operating on a supply voltage on the order of 100 volts, the use of two lamp bulbs 104 in series in line 99 is preferred in order to divide the voltage applied to each lamp for increased life in service use. With two bulbs rated at 150 watts at 110 volts, the Model 3010 honing machine sold by Barnes Drill Co., Rockford, Ill., will produce a maximum of approximately 1000 pounds of push rod force. Varying the rated wattage of the bulbs varies the maximum force that can be developed. For example, with two 200-watt control bulbs, the above machine produces a maximum push rod force of approximately 2200 pounds. Of course, the actual force developed also depends upon the established gear ratios of the machine. The stepping switch 112 may be of the type sold by Allied Electronics, Chicago, Ill., as the Guardian Stepping Relay, Type MER. The transformer 105 is of the type sold by Superior Electric Co., Bristol, Conn., as the Model 10B Powerstat. The voltage change with two seconds of selecting motor operation preferably is on the order of 2–4% of capacity.

Shown in FIG. 4 is an alternate form of the control in which the feed motor torque is adjusted by means of a rheostat 147 connected in parallel with the lamp bulb 104' and operable to vary the equivalent resistance of the lamp/rheostat combination for a given resistance of the filament 103'. Instead of operating on the strength of the field 101' and the resulting flux value in the equation $T = K\phi I_a$, this control regulates $I_a$ to vary the torque. When the rheostat is set for a relatively high resistance, the feed motor 75' develops its lowest torque, and progressive reductions in the rheostat resistance progressively increase the torque of the motor.

This type of control is particularly well suited for use with smaller feed motors 75' on the order, for example, of 1/150 H.P. In such a system, a representative rating of the lamp bulb 104' would be 50 watts at 250 volts, used with a rheostat adjustable to 5000 ohms and connected in series with a fixed resistance 148 of 250 ohms. The automatic adjustment of the rheostat is accomplished in substantially the same manner as the adjustment of the transformer 105 in the preferred form. The advantage of the preferred form is its ability to maintain high no-load speeds for larger motors at low torque capacity, and its resulting versatility in operation. The honing performance is substantially the same.

I claim as my invention:

1. In a machine for honing the wall of a bore to remove surface roughness therefrom and enlarge the bore to a preselected size, the combination of, an expansible abrading tool, mechanism for expanding said tool, an electric motor having a field winding and an armature driving said expanding mechanism, means for supplying a substantially constant energizing voltage to said motor, a tungsten-filament lamp in series with said armature and progressively reducing the armature voltage to modulate the increase in current drawn by said armature and the resulting increase in the torque exerted by said motor as the honing cycle progresses and the increasing resistance to expansion of said tool drops the speed of said motor, a selector for increasing and decreasing the torque of said motor independently of the prevailing resistance of said lamp, a reversible motor connected to said selector to effect such increases and decreases upon operation of said reversible motor in opposite directions, first means operable when said armature voltage attains a preselected low value to operate said reversible motor to increase the motor torque by a preselected increment, and second means operable when said armature voltage attains a preselected higher value to operate said reversible motor to decrease said torque capacity thereby to maintain said armature voltage within a preselected approximate range for optimum honing force throughout the honing cycle.

2. The combination as defined in claim 1 in which said first and second means include a meter relay measuring said armature voltage and actuating a first switch in response to attainment of said preselected low value and a second switch in response to attainment of said preselected higher value, said reversible motor being operated in opposite direction in response to actuation of the respective switches.

3. The combination as defined in claim 1 further including a timer for deactivating said reversible motor in each direction of operation after a preselected time interval of operation thereby to produce a preselected increment of adjustment of said selector in each direction.

4. The combination as defined in claim 1 further including means for delaying operation of said reversible motor for a preselected time interval after one of said preselected voltages is attained and initiating motor operation only if the voltage remains at the preselected value after the delay thereby to avoid corrective action in response to transient conditions.

5. The combination as defined in claim 1 in which said selector is a device for strengthening and weakening the field energization of said electric motor.

6. The combination as defined in claim 1 in which said selector is a rheostat in parallel with said lamp for varying the equivalent resistance of the lamp/rheostat combination for any given resistance of the lamp filament.

7. In a machine for honing the wall of a bore to remove surface roughness therefrom and enlarge the bore to a preselected size, the combination of, an expansible abrading tool, mechanism for expanding said tool, an electric motor having a filed winding and an armature driving said expanding mechanism, means for supplying a preselected energizing voltage to said motor, a tungsten-filament lamp in series with said armature and reducing the terminal voltage of the armature as the current drawn thereby increases with the resistance to expansion offered by said wall, a selectively adjustable device for varying field strength of said motor, and mechanism automatically adjusting said device to increase the field strength when said armature voltage attains a preselected low value thereby to increase the motor torque by a preselected increment and adjusting said device to reduce said field strength when said armature voltage attains a preselected higher value thereby to reduce the motor torque.

8. In a machine for honing the wall of a bore to remove surface roughness therefrom and enlarge the bore to a preselected size, the combination of, an expansible abrading tool, mechanism for expanding said tool, an electric motor having a field winding and an armature driving said expanding mechanism, means for supplying a preselected energizing voltage to said motor, a resistor in series with said armature having a positive temperature coefficient of resistance and a temperature that varies over a wide range with the current flowing through the resistor thereby reducing the terminal voltage of the armature as the current drawn thereby increases with the resistance to expansion offered by said wall, a selector for varying the torque of said motor independently of the prevailing resistance of said resistor, and mechanism operating said selector when said armature voltage attains a preselected low value to increase the motor torque by a preselected increment and when said armature voltage attains a preselected higher value to reduce the motor torque thereby to maintain said voltage within a preselected approximate range.

9. In a machine for honing the wall of a bore to remove surface roughness therefrom and enlarge the bore to a preselected size, the combination of, an expansible abrading tool, mechanism for expanding said tool within said bore, an electric motor having an armature driving said expanding mechanism, a resistor in series with said armature having a positive temperature coefficient of resistance and a temperature that varies over a wide range with variations in the current flowing through the resistor thereby reducing the voltage across said armature as the the current drawn by the armature increases with the resistance to expansion offered by said wall, means indicating the varying voltage across said armature during honing, a selector for varying the torque of said motor independently of the prevailing resistance of said resistor, and means responsive to said indicating means and operating said selector when said varying voltage attains a preselected low value to increase the torque exerted by said motor thereby to increase the honing force level independently of the effect of said resistor.

10. The combination as defined in claim 9 in which said resistor is a tungsten filament in a protective atmosphere.

11. In a machine for honing the wall of a bore to remove surface roughness therefrom and enlarge the bore to a preselected size, the combination of, an expansible abrading tool, mechanism for expanding said tool within said bore, an electric motor having a field and an armature driving said expanding mechanism, first means for supplying a preselected energizing voltage to said motor, second means responsive to the current drawn by said armature and operable to reduce the terminal voltage thereof as said current increases with resistance to expansion of said tool thereby to modulate the current increase and the resulting torque exerted by said motor, a selector for adjusting the torque of said motor independently of said second means, and mechanism operating said selector when said armature voltage attains a preselected low value to increase the torque exerted by said motor and when said armature voltage attains a preselected high value to reduce the torque exerted by said motor thereby to maintain said voltage within a preselected approximate range.

12. The combination as defined in claim 11 in which said second means is a tungsten filament in series with said armature and in a protective atmosphere.

13. The combination as defined in claim 12 in which said torque selector is a device for selectively adjusting the strength of said field.

14. The combination as defined in claim 12 in which said selector is a rheostat connected in parallel with said filament and varying the equivalent resistance of the filament/rheostat combination for a given resistance of the filament.

References Cited
UNITED STATES PATENTS

| 2,301,111 | 11/1942 | Cuppers et al. | 51—34 X |
| 2,781,616 | 2/1957 | Estabrook | 51—34 X |
| 2,819,566 | 1/1958 | Johnson | 51—165 X |

LESTER M. SWINGLE, *Primary Examiner.*